United States Patent [19]

Akamatsu

[11] Patent Number: 5,310,616
[45] Date of Patent: May 10, 1994

[54] TONER COMPOSITIONS FOR ELECTROSTATIC DEVELOPERS WITH ORGANO SILOXANE RESIN

[75] Inventor: Shoji Akamatsu, Chiba Prefecture, Japan

[73] Assignee: Dow Corning Toray Silicone Co., Ltd., Tokyo, Japan

[21] Appl. No.: 118,082

[22] Filed: Sep. 8, 1993

Related U.S. Application Data

[63] Continuation-in-part of Ser. No. 102,024, Aug. 4, 1993, which is a continuation-in-part of Ser. No. 024,698, Mar. 1, 1993, abandoned.

[30] Foreign Application Priority Data

Mar. 13, 1992 [JP] Japan .................................. 4-89622
Aug. 6, 1992 [JP] Japan ................................ 4-228023
Sep. 11, 1992 [JP] Japan ................................ 4-269472

[51] Int. Cl.$^5$ .......................................... G03G 9/097
[52] U.S. Cl. .................................................. 430/110
[58] Field of Search ........................................ 430/110

[56] References Cited

U.S. PATENT DOCUMENTS

| | | | |
|---|---|---|---|
| 4,568,625 | 2/1986 | Uchiyama et al. | 430/110 |
| 4,640,881 | 2/1987 | Dennis | 430/106.6 |
| 5,043,239 | 8/1991 | Kukimoto | 430/110 X |
| 5,202,215 | 4/1993 | Kanakura et al. | 430/110 X |

FOREIGN PATENT DOCUMENTS

| | | | |
|---|---|---|---|
| 108671 | 8/1980 | Japan . | |
| 197052 | 11/1984 | Japan . | |
| 6266 | 1/1987 | Japan . | |
| 18571 | 1/1987 | Japan . | |
| 139358 | 6/1988 | Japan | 430/110 |
| 46470 | 2/1990 | Japan | 430/110 |
| 105356 | 5/1991 | Japan . | |
| 155561 | 7/1991 | Japan | 430/110 |
| 276166 | 9/1991 | Japan . | |

*Primary Examiner*—Roland Martin
*Attorney, Agent, or Firm*—Robert Spector

[57] ABSTRACT

Toner compositions for electrostatic copiers containing siloxane resins with difunctional and trifunctional siloxane units as charge regulating agents are releasable, and have very stable charging properties with respect to temperature and humidity. When the siloxane units of the resin contain aminofunctional hydrocarbon radicals, haloalkyl radicals, or residues derived from organophosphorus esters, the presence of prior art charge regulators is not required.

5 Claims, No Drawings

TONER COMPOSITIONS FOR ELECTROSTATIC DEVELOPERS WITH ORGANO SILOXANE RESIN

REFERENCE TO COPENDING APPLICATIONS

This application is a continuation-in-part of copending application Ser. No. 08/102,024 now allowed, filed on Aug. 4, 1993, which in turn is a continuation-in-part of application Ser. No. 08/024,698, filed on Mar. 1, 1993, now abandoned.

BACKGROUND OF THE INVENTION

1. Field of the Invention

The present invention relates to toner compositions for electrostatic developing. More particularly, this invention relates to toner compositions with good release properties, and with charging characteristics that are very stable with respect to temperature and humidity.

2. Background Information

Toner compositions for electrostatic developing (ED) processes typically contain at least one thermoplastic resin and a colorant as principal ingredients together with various optional additives, for example, charging regulators, fluidizers, fillers, and cleaners. The homogeneity, charging properties, fluidity, fusing characteristics, and other properties of these ED toner can be regulated or adjusted by selecting particular combinations of these ingredients.

One problem with prior art ED toners is the variation of their charging properties with temperature and humidity. These toners do not release well from hot-fixing rolls, and as a result stain the surface of such rolls. In addition, the heavy metal-based organometallic compounds heretofore used as charging regulators are colored and toxic. As a consequence, the resulting ED toner is toxic to humans and contaminates the environment, and, in the case of color copiers, suffers from a degraded color tone.

One objective of the present invention is to provide a releasable ED toner whose charging properties are very stable with respect to temperature and humidity. A second objective of this invention is to the introduction of a releasable ED toner containing a white charging regulator comprising an organosiloxane resin.

SUMMARY OF THE INVENTION

The objectives of the present invention can be achieved using specified classes of organosiloxane resins as the charge-regulating ingredient of ED toner compositions. The resins contain difunctional and trifunctional siloxane units. The repeating units can include aminoalkyl or haloalkyl radicals that are bonded to silicon, or esters of phosphorus-containing acids or esters that are bonded to silicon through an alkylene radical.

DETAILED DESCRIPTION OF THE INVENTION

The present invention provides a toner composition for an electrostatic developer, said composition comprising an organic resin, a pigment, and a charging regulator comprising an organosiloxane resin having a combination of monofunctional and difunctional repeating units, where said combination is selected from the group consisting of $$(R^1SiO_{3/2})_m(R^1_2SiO)_n, \quad (R^2SiO_{3/2})_m(R^2_2SiO)_n,$$

-continued $$(R^3SiO_{3/2})_m(R^3_2SiO)_n, \text{ and } (R^4SiO_{3/2})_a(R^4_2SiO)_b(R^4SiO)_c$$

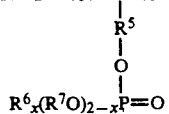

where each $R^1$, $R^4$, $R^6$ and $R^7$ are individually selected from monovalent unsubstituted and substituted hydrocarbon radicals, each $R^2$ is individually selected from the group consisting of monovalent hydrocarbon radicals and aminoalkyl radicals, where at least a portion of the $R^2$ substituents are aminoalkyl radicals, each $R^3$ is individually selected from the group consisting of monovalent hydrocarbon radicals and haloalkyl radicals, with the proviso that at least a portion of the $R^3$ substituents are haloalkyl radicals, a and c are positive numbers, b is 0 or a positive number, and m and n are both positive numbers, with the proviso that the sum of and a, b and c and the sum of m and m each represent molecular weights equivalent to a softening point for said organosiloxane resin greater than 25° C. and not greater than 200° C.

The Organosiloxane Resin

The inventive feature of the present toner compositions is the organosiloxane resin.

One type of resin contains unsubstituted hydrocarbon radicals and can be represented by the general formula I $$(R^1SiO_{3/2})_m(R^1_2SiO)_n \qquad \text{I}$$

$R^1$ and $R^2$ in this formula represent identical or different monovalent hydrocarbon radicals. Hydrocarbon radicals that can be represented by $R^1$ and $R^2$ contain from 1 to about 20 carbon atoms, and include but are not limited to alkyl radicals such as methyl, ethyl, propyl, butyl, pentyl and hexyl; cycloalkyl radicals such as cyclopentyl, cyclohexyl and cycloheptyl; alkenyl radicals such as vinyl, allyl, butenyl and hexenyl; aryl radicals such as phenyl, tolyl, and xylyl; and aralkyl groups such as benzyl, phenethyl and phenylpropyl.

The subscripts m and n are positive numbers and provide a molecular weight such that the resin softens above room temperature, typically 25° C., but no higher than 200° C. The softening points of preferred resins do not exceed 150° C.

This restriction on the softening point of the organosiloxane resin makes possible the uniform dispersion of the organosiloxane resin in the thermoplastic organic resin through the softening and melting of both types of resins during preparation of the present ED toner compositions. The organic resin constitutes the major ingredient of the present toner compositions and is described in a subsequent section of this specification.

The softening temperature of the organosiloxane resin is least room temperature, typically 25° C., in order to prevent bleed-out of the organosiloxane resin from the ED toner composition. When the ED toner of the present invention contains an organosiloxane resin with repeating units corresponding to formula I, the charging characteristics of the resin will be very stable with respect to temperature and humidity and the ED toner itself will be highly releasing.

A second type of organosiloxane resin suitable for use in the present ED toner compositions corresponds to general formula II $$(R^2SiO_{3/2})_m(R^2{}_2SiO)_n \quad \text{II}$$

Each $R^2$ in formula II is selected from the group consisting of unsubstituted monovalent hydrocarbon radicals and aminoalkyl radicals, with the proviso that at least a portion of the groups represented by $R^2$ are aminoalkyl radicals.

The unsubstituted hydrocarbon radicals represented by $R^2$ are selected from the same group defined for $R^1$ in formula I.

When $R^2$ represents an aminoalkyl radical, suitable radicals include but are not limited to primary aminoalkyl radicals such as aminoethyl, aminopropyl and aminobutyl; secondary aminoalkyl groups such as N-methylaminopropyl, N-ethylaminopropyl, 8-phenyl-4,7-diazaoctyl and 4,7-diazapentadecyl; combinations of primary and secondary aminoalkyl groups such as N-(2-aminoethyl)-3-aminopropyl and N-(3-aminopropyl)-3-aminopropyl; the salts of primary aminoalkyl groups such as the hydrochloride of the aminoethyl group, the hydrobromide of the aminoethyl group, the hydrochloride of the aminopropyl group, and the hydrochloride of the aminobutyl group; the salts of secondary aminoalkyl groups such as the hydrochloride of the N-methylaminopropyl group, the hydrochloride of the N-ethylaminopropyl group, the hydrochloride of the 8-phenyl-4,7-diazaoctyl group, and the hydrobromide of the 4,7-diazapentadecyl group; tertiary aminoalkyl groups such as N,N-dimethylaminopropyl and N,N-methylethylaminopropyl; the hydrochloride of the N,N-dimethylaminopropyl group; and quaternary aminoalkyl groups.

The subscript m and n are described in connection with formula I, and are selected to achieve the desired softening point for the organosiloxane resin.

When the ED toner of the present invention contains an organopolysiloxane resin with repeating units corresponding to formula II, the charging characteristics of the toner will be very stable with respect to temperature and humidity and the toner will be highly releasing.

A third class of organosiloxane resins suitable for use in the present ED toner compositions has the general formula represented by formula III.

$$(R^3SiO_{3/2})_m(R^3{}_2SiO)_n \quad \text{III}$$

$R^3$ in formula III is selected from the group consisting of monovalent hydrocarbon radicals and haloalkyl radicals, with the proviso that at least a portion of $R^3$ are haloalkyl radicals.

The monovalent hydrocarbon radicals represented by $R^3$ are selected from the same class as the hydrocarbon radicals represented by $R^1$ in formula I, discussed in a preceding section of this specification.

The haloalkyl radicals represented by $R^3$ include but are not limited to chloromethyl, bromomethyl, chloroethyl, chloropropyl, chlorobutyl, 3,3,3-trifluoropropyl, 3,3,4,4,5,5,6,6,7,7,8,8,8-tridecafluorooctyl, and 3,3,4,4,5,5,6,6,7,7,8,8,9,9,10,10,10-heptadecafluorodecyl.

The subscripts m and n are selected to provide the desired softening point for the resin, as previously discussed in connection with formula 1.

A fourth class of organosiloxane resins suitable for the present toner compositions can be represented by formula IV $$(R^4SiO_{3/2})_a(R^4{}_2SiO)_b(R^4SiO)_c \atop \underset{R^6{}_x(R^7O)_{2-x}P=O}{\overset{\underset{|}{R^5}}{\underset{|}{O}}} \quad \text{IV}$$

where $R^4$, $R^6$ and $R^7$ represents identical or different monovalent unsubstituted hydrocarbon radicals, $R^5$ is a divalent hydrocarbon radical, a and c are a positive numbers, b is 0 or a positive number, with the proviso that the sum and a, b and c provides a molecular weight equivalent to a softening point for said organosiloxane resin greater than 25° C. and not greater than 200° C., and x is 0, 1 or 2.

Examples of the monovalent hydrocarbon radicals represented by $R^4$, $R^6$ and $R^7$ include but are not limited to alkyl radicals such as methyl, ethyl, propyl, butyl, pentyl, and hexyl; aryl radicals such as phenyl, tolyl, and xylyl; alkenyl radicals such as vinyl, allyl, butenyl, pentenyl, and hexenyl; and aralkyl radicals such as benzyl and phenethyl. Example of the divalent hydrocarbon radicals represented by $R^5$ include but are not limited to alkylene such as methylene, ethylene, propylene, butylene and phenylene.

Additionally, a in the formula IV is a positive number that indicates the number of trifunctional siloxane units (T units) expressed by the formula:

$$R^4SiO_{3/2}$$

b is 0 or a positive number showing the number of difunctional siloxane units (D units) expressed by the formula:

$$R^4SiO_{2/2}$$

and c is a positive number showing the number of difunctional siloxane units (D units) expressed by the formula:

$$R^4{}_2SiO_{2/2}$$

In the portion of the phosphorus-containing repeating unit represented by $R^6{}_x(R^7O)_{(2-x)}P(O)$—, x is 0, 1, or 2. When x is 0, the organopolysiloxane contains a phosphate ester group. When x is 1, the organopolysiloxane contains a phosphonic ester group. When x is 2, the organopolysiloxane contains a phosphinic ester group.

There are no special limitations on the method for manufacturing the phosphorus-containing organopolysiloxanes represented by formula IV. For example, they can be manufactured by reacting, in the presence of a tertiary amine compound, (1) a haloalkyl group-containing organopolysiloxane of the average formula:

$$(R^4SiO_{3/2})_a(R^4SiO)_b(R^4R^8SiO)_c$$

where $R^4$ is a, monovalent hydrocarbon radical, $R^8$ is a haloalkyl radical, a is a positive number, b is 0 or a positive number, and c is a positive number, and (2) a phosphorus-containing organic compound represented by the general formula:

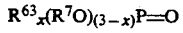

where $R^6$, $R^7$ and x are as defined for formula IV.

The softening temperature of the final phosphorus-containing organopolysiloxane resin must not exceed 200° C., preferably 150° C. This is due to the fact that, in manufacturing the toner for an electrostatic developer of the present invention, these values make it possible to uniformly mix the thermoplastic resin and aforementioned phosphorus-containing organopolysiloxanes by softening and melting them. In addition, it is desirable that the softening point of the aforementioned phosphorus-containing organopolysiloxanes be greater than room temperature. This is to prevent the aforementioned phosphorus-containing organopolysiloxanes from bleeding out of the toner for an electrostatic developer of the present invention when said toner is being stored at room temperature.

When the ED toner composition contains an organopolysiloxane corresponding to formula II, III or IV, its charging characteristics will be very stable with respect to temperature and humidity and the ED toner itself will be highly releasing.

Resins containing aminoalkyl radicals corresponding to formula II can be used as a charging regulator that will control or regulate the polarity of the ED toner to a high positive polarity.

Resins containing haloalkyl radicals or organophosphorus groups, corresponding to formula III and IV, respectively, will control or regulate the polarity of the toner to a high negative polarity.

In addition, because the organosiloxane resins represented by formulae II, III and IV are translucent or white, they will not adversely affect toner color in the case of ED toner for color copiers.

The Thermoplastic Organic Resin

The thermoplastic organic resin is the principal ingredient of the present ED toner compositions. The type of resin selected for this ingredient is not specifically restricted, and any thermoplastic resin typically used for prior art ED toner compositions can be employed in the present.

The organic resin can be a natural or synthetic resin. Examples of suitable thermoplastic organic resins include but are not limited to polystyrene resins, alpha-methylstyrene resins, chlorostyrene resins, styrene/acrylic copolymers, styrene/butadiene copolymers, styrene/butyl methacrylate copolymers, styrene/divinylbenzene/butyl acrylate copolymers, styrene/maleic acid copolymers, acrylic resins, methacrylic resins, ethyl methacrylate resins, butadiene resins, isoprene resins, acrylonitrile resins, vinyl ether resins, vinyl acetate resins, polycarbonate resins, polyurethane resins, fluororesins, polyester resins, epoxy resins, polyamide resins, and natural and synthetic waxes.

The softening point of the thermoplastic resin is not specifically restricted, but preferably does not exceed 200° C. The proportion of thermoplastic organic resin in ED toner of the present invention is not specifically restricted, but preferably constitutes from 80 to 90 weight percent of the in the ED toner composition.

Pigments and Other Colorants

A pigment or other colorant is a required ingredient of the present toner compositions. This ingredient determines the color of the composition, and its type is not specifically limited. Suitable pigments and colorants include but are not limited to black pigments such as carbon black, oil black, and graphite; organic dyes such as Quinoline Yellow, Phthalocyanine Blue, and Malachite Green oxalate; acetoacetic arylamide-type monoazo yellow pigments such as C.I. Pigment Yellow 1, C.I. Pigment Yellow 3, C.I. Pigment Yellow 74, C.I. Pigment Yellow 97, and C.I. Pigment Yellow 98; acetoacetic arylamide-type diazo yellow pigments such as C.I. Pigment Yellow 12, C.I. Pigment Yellow 13, C.I. and Pigment Yellow 14; yellow dyes such as C.I. Solvent Yellow 19, C.I. Solvent Yellow 77, C.I. Solvent Yellow 79, C.I. and Disperse Yellow 164; red or magenta pigments such as C.I. Pigment Red 48, C.I. Pigment Red 49:1, C.I. Pigment Red 53:1, C.I. Pigment Red 57:1, C.I. Pigment Red 81, C.I. Pigment Red 122, and C.I. Pigment Red 5; red dyes such as C.I. Solvent Red 52, C.I. Solvent Red 58, and C.I. Solvent Red 8; blue dyes and pigments such as C.I. Pigment Blue 15:3 and copper phthalocyanine and its derivatives and modified products; green pigments such as C.I. Pigment Green 7, and C.I. Pigment Green 36; and colored and leuco sublimable dyes. While the proportion of colorant in the ED toner of the present invention is not specifically restricted, the present ED toner compositions preferably contain a total of from 1 to 20 weight % of one or more colorants.

Optional Ingredients

In addition to the resins and colorants ingredients described in the preceding sections of this specification, the present ED toner compositions may optionally contain charging regulators other than the present organosiloxane resins, fluidizer, fillers, and cleaners. These optional ingredients will be described in greater detail in the following section of this specification.

Charging regulators other than the organosiloxane resins described in a preceding section of this specification can be present as an optional ingredient whose purpose is to further control or regulate the type and amount of charge on the ED toner particles. The type of optional charge regulator is not specifically limited. Suitable classes of optional charging regulators include but are not limited to chromium complexes of azo dyes, chromium complexes of aromatic hydroxycarboxylic acids, the aluminum complexes of aromatic hydroxycarboxylic acids and aromatic carboxylic acids, zinc complexes of aromatic hydroxycarboxylic acids and aromatic carboxylic acids, and boron complexes of aromatic hydroxycarboxylic acids and aromatic carboxylic acids.

An optional charge regulator is preferably included when the hydrocarbon radicals of the charge-regulating organosiloxane resin contain only unsubstituted hydrocarbon radicals, corresponding to formula I in the preceding section of this specification.

When general formula of the organosiloxane resin corresponds to formula II, III or IV the presence of additional charge regulators is optional.

The concentration of optional charge regulator is not specifically limited, however a range of from 1 to 5 weight percent, based on the total weight of the toner composition is preferred.

Fluidizers are optional ingredients whose purpose is to improve the flowability of the ED toner, and there are no specific limitations regarding the type of fluidizer. Suitable fluidizers include but are not limited to colloidal silica, metal soaps, and non-ionic surfactants. The concentration of proportion of fluidizer in the ED toner composition is not specifically restricted, but is preferably from 0.1 to 2 weight percent, based on the total weight of the toner composition.

When the present compositions contain a filler, suitable ones include but are not limited to silica, alumina, titanium dioxide, barium titanate, zinc oxide, quartz sand, iron oxide, ferrite, calcium carbonate, clay, and talc. The concentration of filler is not specifically restricted, but preferably constitutes from 1 to 5 weight percent, based on the total weight of the toner composition.

Suitable cleaners that can be present include but are not limited to metal salts of fatty acids, fluorine surfactants, and silicon oxide derivatives. The concentration of cleaner is not specifically restricted, but preferably constitutes from 0.1 to 1 weight percent of the present compositions.

Preparation of Toner Compositions

The present ED toner compositions can be prepared by mixing to homogeniety the required ingredients and any of the optional ingredients various components and optional components described hereinbefore. The method for preparing the ED toner is not specifically restricted, and can use conventional manufacturing equipment. Suitable equipment includes but is not limited to Ross mixers, kneader mixers, ball mills, and Henschel mixers.

The temperature to which the composition is heated during preparation must be at least to the softening points of the thermoplastic and organopolysiloxane resins used to prepare the composition.

The charging properties of the ED toner compositions of the present invention are very stable with respect to temperature and humidity due to the presence of the organosiloxane resin. This stability allows the toner compositions to be used in electrostatic copiers that are operated in harsh environments. Moreover, because the ED toner of the present invention is releasing, it makes possible a substantial simplification of the roll cleaning mechanism, such as by allowing for the elimination of fuser oil for fixing rolls.

When the organosiloxane resin ingredient of the present toner compositions contains the aminoalkyl radicals represented by R2 in formula II, the organosiloxane resin can function as a white charging regulator. As a result, the composition of the ED toner can be simplified by the elimination of prior art non-silicone type charging regulators described in a preceding section of this specification unnecessary. Moreover, the organosiloxane resin corresponding to formula II can be used as a charging regulator for ED toner for various types of color copiers. In this application it is less toxic to humans and less environmentally burdensome than the heretofore known ED toners.

EXAMPLES

The following examples describe preferred embodiments of the present ED toner compositions and should not be interpreted as limiting the scope of the invention defined in the accompanying claims. Unless otherwise specified in the examples all parts and percentages are by weight and measurements were conducted at 25° C.

To measure peel force, a thin layer of the ED toner composition was applied to a 6 mm-thick silicone rubber intended for use on the hot pressure-fixing rolls of a copier. The composition was then heated to bond it to the surface of the sheet. A commercial pressure-sensitive adhesive taps (width=1.8 cm) was applied over the bonded layer, and high-speed peel test was then carried out by peeling the tape from the sheet using an angle of 180° and a peel rate of 100 m/minute.

REFERENCE EXAMPLE 1

100 g water, 100 g isopropyl alcohol, and 400 g toluene were introduced into a 2 L round-bottom flask equipped with a stirrer, thermometer, and addition funnel. A liquid mixture containing 297 g (approximately 1.4 moles) phenyltrichlorosilane, 76 g (approximately 0.3 moles) diphenyldichlorosilane, and 39 g (approximately 0.3 moles) dimethyldichlorosilane was then added dropwise to the liquid in the reactor over a 1 hour period while stirring the reaction mixture. Following completion of this addition, the reaction mixture was heated at the boiling point for 2 hours and then cooled. The stirrer was stopped, the contents of the flask were allowed to settle, and the lower layer was drawn off. 600 g 10 weight % aqueous sodium bicarbonate was added followed by stirring for 30 minutes and then quiescence. The lower layer was again drawn off. The pH was determined to be 10.

The following 4 steps was then repeated twice: addition of 600 g water, stirring for 30 minutes, allowing the reaction mixture to settle, and removal of the lower toluene-containing layer. The resulting toluene solution was heated at 150° C./30 torr in order to remove the toluene and distillates. The residue was transferred to a metal vat to yield a thick liquid at 150° C. After cooling to room temperature, the resultant solid was ground in a mortar to yield a white microparticulate organopolysiloxane resin.

This organosiloxane resin had a softening point of 95° C. and the following structural formula.

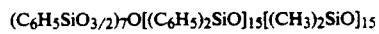

$(C_6H_5SiO_{3/2})_{70}[(C_6H_5)_2SiO]_{15}[(CH_3)_2SiO]_{15}$

REFERENCE EXAMPLE 2

100 g water, 100 g isopropyl alcohol, and 400 g toluene were introduced into a 2 L round-bottom flask equipped with a stirrer, thermometer, and addition funnel. A liquid mixture containing 297 g (approximately 0.3 moles) diphenyldichlorosilane, and 39 g (approximately 0.3 moles) dimethyldichlorosilane was then added dropwise over 1 hour with stirring. Following completion of this dition, the reaction solution was heated under reflux for 2 hours and then cooled. The stirrer was then stopped, the contents of the flask were allowed to settle, and the lower layer was drawn off. 600 g 10 weight % aqueous sodium bicarbonate were added, followed by stirring for 30 minutes and then quiescence. The lower layer was again drawn off, and the pH was measured as 10.

The following four steps were repeated twice: addition of 600 g water, stirring for 30 minutes, settling, and removal of the lower layer. The a portion of the toluene and water were then removed by heating at 150° C. under reduced pressure to obtain a solution containing 50% of a volatile fraction. The resultant toluene solution of an organopolysiloxane resin had a viscosity of 0.06 Pa.s at 25° C.

25 g N-(2-aminoethyl)-3-aminopropylmethyldimethoxysilane was then added to 500 g of the organopolysiloxane resin solution prepared as described in the preceding section of this example. After heating the reaction mixture for 5 hours at the reflux temperature, the reaction mixture was concentrated at a temperature of 150° C. under a pressure 30 torr. The resultant viscous concentrate was then immediately transferred to a metal metal and allowed to cool to room temperature. The resultant solid was ground in a mortar to yield a white finely divided resin containing N-(2-aminoethyl)-3-aminopropyl-methylsiloxane units. The organosiloxane resin had a softening point of 80° C. and the following structural formula.

$(C_6H_5SiO_{3/2})_{70}[(C_6H_5)_2SiO]_{15}[(CH_3)_2SiO]_{15}[H_2NC_2H_4NHC_3H_6(CH_3)SiO]_{12}$

REFERENCE EXAMPLE 3

525 g toluene, 525 g of the final resin described in Reference Example 2, and 15.7 g benzyl chloride were placed in a 1 L round-bottom flask equipped with stirrer, thermometer, and addition funnel and heated at the reflux temperature of toluene for 2 hours. When this reaction mixture was analyzed by silver nitrate titration, the chlorine concentration was 0.7 weight %, which was 94.6 percent of the theoretical value. The solvents were removed by heating the solution to a temperature of 150° C. under a pressure of 30 torr. The resultant viscous liquid was immediately transferred to a metal vat and allowed to cool. The resultant solid was ground using a mortar to yield the hydrochloride of an organosiloxane resin containing 8-phenyl-4,7-diazaoctyl radicals bonded to silicon. The resin was in the form of a very slightly yellow finely divided powder. This resin had a softening point of 75° C. to 85° C. and the following structural formula.

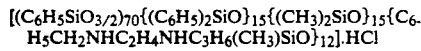
$[(C_6H_5SiO_{3/2})_{70}\{(C_6H_5)_2SiO\}_{15}\{(CH_3)_2SiO\}_{15}\{C_6H_5CH_2NHC_2H_4NHC_3H_6(CH_3)SiO\}_{12}] \cdot HCl$

REFERENCE EXAMPLE 4

525 g toluene, 525 g of the N-(2-aminoethyl)-3-aminopropyl-containing organosiloxane resin prepared in Reference Example 2, and 24.0 g octyl bromide were placed in a 1 L round-bottom flask equipped with stirrer, thermometer, and addition funnel and heated at the reflux temperature of toluene for 2 hours. When this reaction mixture was analyzed by silver nitrate titration, the bromine concentration was 0.8 weight %, which was 90.6 percent of the theoretical value.

The toluene and other volatile materials were then removed by heating 150° C. under a pressure of 30 torr. The resultant viscous liquid was immediately transferred to a metal vat and allowed to cool to room temperature. The resultant solid was ground with a mortar to yield the hydrobromide of a 4,7-diazapentadecyl containing organosiloxane resin in the form of a very slightly yellow finely divided powder. This resin had a softening point of 75° C. to 85° C. and the structural formula.

$[(C_6H_5SiO_{3/2})_{70}\{(C_6H_5)_2SiO\}_{15}\{(CH_3)_2SiO\}_{15}\{C_8H_{17}NHC_2H_4NHC_3H_6(CH_3)SiO\}_{12}] \cdot HBr$

REFERENCE EXAMPLE 5

100 g water, 100 g isopropyl alcohol, and 400 g toluene were introduced into a 2 L round-bottom flask equipped with a stirrer, thermometer, and addition funnel. The liquid mixture of 297 g (approximately 1.4 moles) phenyltrichlorosilane, 76 g (approximately 0.3 moles) diphenyldichlorosilane, and 39 g (approximately 0.3 moles) dimethyldichlorosilane was then added dropwise over 1 hour while stirring the reaction mixture. Following completion of this addition, the reaction mixture was heated at the boiling point for 2 hours and then cooled. The stirrer was stopped and the contents of the flask allowed to settle, at which time the lower layer was drawn off. 600 g of a 10 weight % aqueous sodium bicarbonate was introduced followed by stirring for 30 minutes. When the reaction mixture had settled the lower layer was again drawn off. The pH was measured as 10.

The following process was then repeated twice: addition of 600 g water, stirring for 30 minutes, settling, and removal of the lower layer. Using an evaporator to distill the toluene and water from the resulting toluene solution, sufficient toluene was removed at 150° C. under a pressure of 5 mm Hg to obtain a solution containing 50% of volatile materials. The resultant solution had a viscosity of 6 centipoise. 25 g of 3-chloropropyl-methyldimethoxysilane was then introduced into 500 g of this solution, followed by heating at the boiling point for 5 hours.

The reaction mixture was then concentrated by heating at a temperature of 150° C. under a pressure of 30 torr to remove the toluene and distillates. The resultant thick liquid was immidiately transferred to a metal vat and allowed to cool to room temperature. The resultant solid as ground using a mortar to yield a white microparticulate organosiloxane resin. This organopolysiloxane resin had a softening point of 80° C. and the structural formula

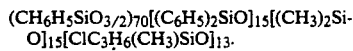
$(CH_6H_5SiO_{3/2})_{70}[(C_6H_5)_2SiO]_{15}[(CH_3)_2SiO]_{15}[ClC_3H_6(CH_3)SiO]_{13}$.

REFERENCE EXAMPLE 6

100 g water, 100 g isopropyl alcohol, and 400 g toluene were charged into a 2-L round-bottomed flask equipped with an* agitator, a thermometer, and a dropping funnel, and a mixed solution of 297 g (about 1.4 mol) phenyltrichlorosilane, 76 g (about 0.3 mol) diphenyldichlorosilane, and 39 g (about 0.3 mol) dimethyldichlorosilane were added dropwise to this system over a period of 1 hour with stirring. After the conclusion of the dropwise addition, the resulting mixture was heated at the boiling point for 2 hours, and then cooled. After the system had been allowed to stand, the lower layer was removed, 600 g of an aqueous solution containing a 10% concentration of sodium hydrogencarbonate was charged, the mixture was stirred for 30 min, and the lower layer was then removed after the mixture had settled. The pH of the lower layer was 10. The steps of charging 600 g water, stirring for 30 minutes, and then removing the lower level after allowing the system to settle were performed twice. A portion of the toluene and other volatile materials was removed by heating the solution at 150° C. under a pressure of 5 mm. Hg. The resultant solution contained 50 weight percent of volatile materials and had a viscosity of 0.06 Pa.s at 25° C. 25 g 3-chloropropyl(methyl)dimethoxysilane were charged into 500 g of this toluene solution, which was then heated at the boiling point for 5 hours with stirring to yield a solution of a 3-chloropropyl group-containing organopolysiloxane expressed by the general formula 5 was prepared

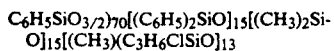

525 g of this solution, 25 g dimethylmethylphosphonate, and 2 g triethylamine were charged into a 1 L round-bottomed flask equipped with an agitator, a thermometer, and a dropping funnel, and the system was heated and agitated for 6 h at toluene reflux temperature. After it had been confirmed that methyl chloride was no longer being released from this system, the low-boiling components were removed by heating the solution at 150° C. under a pressure of 5 mm Hg. The viscous residue was immediately transferred to a metal vat and allowed to cooled to room temperature. After the cooling, a solid phosphorus-containing organopolysiloxane expressed by the formula below was obtained.

The phosphorus-containing organopolysiloxane was slightly yellow and transparent, with a softening point of 75°-85° C. and corresponded to the general formula

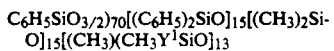

where $Y^1$ represents $-C_3H_6OP(CH_3)(O)OCH_3$.

REFERENCE EXAMPLE 7

100 g water, 100 g isopropyl alcohol, and 400 g toluene were charged into a 2-L round-bottomed flask equipped with an agitator, a thermometer, and a dropping funnel, and a mixed solution of 297 g (about 1.4 mol) phenyltrichlorosilane, 76 g (about 0.3 mol) diphenyldichlorosilane, and 39 g (about 0.3 mol) dimethyldichlorosilane were added dropwise to this system over a period of 1 hour with stirring. Following completion of this addition, reaction mixture was heated at the boiling osthe resulting system was heated, refluxed under heating for 2 h, and then cooled. After the system had been allowed to stand, the lower layer was removed, 600 g of an aqueous solution containing a 10% concentration of sodium hydrogencarbonate was charged, the mixture was stirred for 30 minutes, and the lower layer was then removed after the system had been allowed to stand. The pH of the lower layer was 10. The steps of adding 600 g water, stirring for 30 minutes, and then removing the lower level after allowing the system to settle were preformed twice. The resultant toluene solution was then concentrated at a temperature of under reduced pressure using an evaporator to distill away the toluene and the water. The final solution contained 50% volatile components and had a viscosity of 0.06 Pa.s at 25° C. 25 g 3-chloropropylmethyldimethoxysilane were added to 500 g. of this solution and heated at the boiling point for 5 hours with stirring. The result of this reaction was a toluene solution of a 3-chloropropyl group-containing organopolysiloxane represented by the general formula:

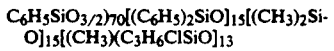

525 g of this solution, 35 g methylphenylmethylphosphonate, and 2 g dimethylbenzylamine were charged into a 1 L round-bottomed flask equipped with an agitator, a thermometer, and a dropping funnel, the reaction mixture was stirred and heated at the reflux temperature of toluene for 6 hours.

When it had been confirmed that methyl chloride was no longer being released from this system, the reaction mixture was concentrated at a temperature of 150° C. under a pressure of 5 mm Hg using an evaporator, the system was removed as a viscous liquid in a metallic vat immediately after the production of distillates stopped, and this liquid was cooled to room temperature.

After the cooling, a solid phosphorus-containing organopolysiloxane expressed by the formula below was obtained. This phosphorus-containing organopolysiloxane was slightly yellow and transparent, with a softening point of 78°-88° C.

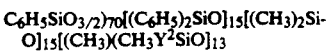

where $Y^2$ is $-C_3H_6OP(O)(CH_3)C_6H_5$

EXAMPLE 1

An ED toner composition of this invention exhibiting an average particle diameter of micrometers was prepared by melt-blending the following ingredients in a kneader mixer for 3 hours while heating, followed by grinding and classification:

| | |
|---|---|
| styrene/acrylic copolymer (softening point = 150° C.) | 100 weight parts |
| organosiloxane resin from Reference Example 1 | 5 weight parts |
| carbon black (#40) | 5 weight parts. |

The resulting ED toner composition had a good flowability. The ED toner was also subjected to surface analysis for the silicon atom using a scanning electron microscope equipped with an X-ray microanalyzer, referred to hereinafter as SEM-XMA. The results demonstrated an extremely homogeneous dispersion of silicon.

The charge retention ability of the toner particles was determined using a "blow-off" test. The test was conducted by shaking for 10 minutes a mixture containing 1.5 parts of the toner particles and 30 parts of iron powder with an average particle size of 300 micrometers. The resultant mixture was placed on a stainless steel filter in a Faraday cage and a stream of nitrogen was blown through the filter for 30 seconds. The toner particles were forced through the holes in the filter under the pressure of the gas, leaving behind the iron particles with a charge of equal magnitude and opposite in polarity to the charge on the toner particles. This charge was then transferred to a capacitor in the Faraday cage circuit and the resultant charge (C) and voltage (V) were measured. The charge to mass ratio for the toner particles was calculated using the formula (CxV)/M, where M is the weight of the toner particles present in the initial mixture.

In order to determine the effects of temperature and humidity, the charged toner particles were spread on a glass petri dish and allowed to stand for 24 hours at 60° C./RH 95%, at which time the charge was measured again using the "blow off" test.

The releasability of the toner particles from a fuser roll maintained at a temperature of 150° C. was also measured.

The results of all evaluations are reported in Table 1.

EXAMPLE 2

An ED toner composition with an average particle diameter of 15 micrometers was prepared by melt-mixing a blend of the following ingredients in a kneader mixer for 3 hours while heating and then grinding and classifying:

| | |
|---|---|
| styrene/acrylic copolymer (softening point = 150° C.) | 100 weight parts |
| organopolysiloxane resin containing the N-(2-aminoethyl)-3-aminopropyl group, from Reference Example 2 | 5 weight parts |
| carbon black (#40) | 5 weight parts. |

The resultant ED toner composition had a good flowability. The ED toner was also subjected to surface analysis for the Si atom using SEM-XMA. These results demonstrated an extremely homogeneous dispersion of the Si.

1.5 weight parts of the ED toner was shaken for 10 minutes in a shaker with 30 weight parts iron powder with average particle size of 300 micrometers. The charge retention ability of the toner particles was measured using the "blow-off" test described in Example 1. In order to examine the effects of temperature and humidity, the charged toner particles were spread on a glass petri dish and allowed to stand for 24 hours at 60° C./RH 95%, at which time the "blow off" test was repeated.

The releasability of the ED toner was also measured as described in Example 1. These results are reported in Table 1.

EXAMPLE 3

An ED toner composition of this invention with an average particle diameter of 15 micrometers was prepared by melt-mixing a composition of the following components in a kneader mixer for 3 hours while heating and then grinding and classifying:

| | |
|---|---|
| styrene/acrylic copolymer (softening point = 150° C.) | 100 weight parts |
| organopolysiloxane resin containing the 8-phenyl-4,7-diazaoctyl group, from Reference Example 3 | 5 weight parts |
| carbon black (#40) | 5 weight parts. |

The resulting ED toner composition had a good flowability. The ED toner was also subjected to surface analysis for the Si atom using SEM-XMA. These results demonstrated an extremely homogeneous dispersion of the Si.

The "blow-off" test described in Example 1 was conducted. To determine the effects of temperature and humidity, the charged toner particles were spread on a glass petri dish and allowed to stand for 24 hours at 60° C./RH 95% and the "blow off" test was repeated. The releasability of the ED toner was also measured as described in Example 1. These results are reported in Table 1.

EXAMPLE 4

An ED toner composition with an average particle diameter of 15 micrometers was prepared by melt-mixing a blend of the following ingredients in a kneader mixer for 3 hours while heating and then grinding and classifying:

| | |
|---|---|
| styrene/acrylic copolymer | 100 weight parts |
| (softening point, 150° C.) | |
| organopolysiloxane resin containing the 4,7-diazapentadecyl group, from Reference Example 4 | 5 weight parts |
| carbon black (#40) | 5 weight parts. |

The resulting ED toner had a good flowability. The toner was also subjected to surface analysis for the Si atom using SEM-XMA. These results demonstrated an extremely homogeneous dispersion of the Si.

The charge retention characteristics of the toner was determined using the "blow-off" test described in Example 1. In order to examine the effects of temperature and humidity, the ED toner, after charging as above, was spread in a glass petri dish and allowed to stand for 24 hours at 60° C./RH 95% and the "blow off" test was repeated.

The releasability of the ED toner was also measured as described in Example 1. These results are reported in Table 1.

EXAMPLE 5

An ED toner composition of this invention with an average particle diameter of 15 micrometers was prepared by melt-blending the following ingredients in a kneader mixer for 3 hours while heating, followed by grinding and classification:

| | |
|---|---|
| styrene/acrylic copolymer (softening point, 150° C.) | 100 weight parts |
| organopolysiloxane resin containing the 3-chloropropyl group, from Reference Example 5 | 5 weight parts |
| carbon black (#40) | 5 weight parts. |

The resultant ED toner composition had good flowability. The toner composition was also subjected to surface analysis for the Si atom using SEM-XMA. These results demonstrated an extremely homogeneous dispersion of Si atoms.

The charge retention characteristics of the toner was determined using the "blow-off" test described in Example 1. To determine the effects of temperature and humidity on charge retention, the charged toner particles were spread on a glass petri dish and allowed to stand for 24 hours at 60° C./RH 95%, at which time "blow off" test was repeated.

The releasability of the ED toner was also measured as described in Example 1. The results of all the testing are reported in Table 1.

COMPARISON EXAMPLE 1

For comparative purposes an ED toner composition outside the scope of the present invention was prepared as described in Example 1 of this specification, with the exception that a commercial azine charging regulator was used in place of the organosiloxane resin used in Example 1. The resulting ED toner was evaluated as described in Example 1, and these results are reported in Table 1.

COMPARISON EXAMPLE 2

An ED toner outside the scope of the present invention was prepared using the procedure and ingredients described in Comparison Example 1, but with the addition of 0.5 weight parts of a liquid polydimethylsiloxane with a viscosity of 500 centistokes. The resultant ED toner composition was evaluated as described in Example 1, and the results are reported in Table 1.

TABLE 1

| Example | Dispersibility | Charge (microcoulombs/g) Initially | Charge (microcoulombs/g) After 24 hr at 60° C. | Peel Force (g/cm) |
|---|---|---|---|---|
| 1 | excellent | 13 | 12 | 20 |
| 2 | excellent | 27 | 25 | 23 |
| 3 | excellent | 31 | 28 | 32 |
| 4 | excellent | 29 | 24 | 34 |
| 5 | excellent | −15 | −11 | 37 |
| Comparison Example 1 | — | 25 | 11 | 123 |
| Comparison Example 2 | poor (oil bleed occurred) | 24 | 14 | 16 |

EXAMPLE 6

A toner for an electrostatic developer with an average particle diameter of 15 μm was prepared by subjecting a composition prepared from the components shown below to heating and 3 hours of melt kneading with a kneader mixer, and subsequently comminuting and classifying the product.

| | |
|---|---|
| Styrene/acrylic copolymer with 150° C. softening point: | 100 parts by weight |
| Phosphorus-containing organopolysiloxane prepared as described in Reference Example 6: | 5 parts by weight |
| Carbon black (#40): | 5 parts by weight |

The resultant toner for an electrostatic developer had good fluidity. As the result of subjecting said toner for an electrostatic developer to surface analysis for Si atoms using SEM-XMA, it was confirmed that the Si atoms were dispersed in an extremely uniform manner. The charge retention characteristics of the toner were determined using the "blow-off" test described in Example 1, and the results are recorded in Table 2. This test was repeated after the toner had been exposed at 60° C. as described in Example 1.

EXAMPLE 7

A toner for an electrostatic developer with an average particle diameter of 15 μm was prepared by subjecting a composition prepared from the components shown below to heating and 3 hours of melt kneading with a kneader mixer, and subsequently comminuting and classifying the product.

| | |
|---|---|
| Styrene/acrylic copolymer with 150° C. softening point: | 100 parts by weight |
| Phosphorus-containing organopolysiloxane prepared in Reference Example 7: | 5 parts by weight |
| Carbon black (#40): | 5 parts by weight |

The resultant toner for an electrostatic developer had good fluidity. As the result of subjecting said toner for an electrostatic developer to surface analysis for Si atoms using SEM-XMA, it was confirmed that the Si atoms were dispersed in an extremely uniform manner. The charge retention characteristics of the toner were determined using the blow-off test described in Example 1 and the mold release properties of the toner in an electrostatic developer were measured. The results of these evaluations are recorded in Table 2.

COMPARATIVE EXAMPLE 3

A toner for an electrostatic developer was prepared in the same manner as Example 6, with the exception that a commercial azine charge regulator was used in place of the phosphorus-containing organopolysiloxane in Application Example 1. The obtained toner for an electrostatic developer was evaluated in the same manner as in Example 1, and the results appear in Table 2.

COMPARATIVE EXAMPLE 4

A toner for an electrostatic developer was prepared in the same manner as described in Comparative Example 3, with the exception that 0.5 part by weight dimethylpolysiloxane with a viscosity of 500 cs was added in addition to the ingredients used in Comparative Example 5. The evaluation of the resultant toner for an electrostatic developer was carried out in the same manner as in Example 1 and the results are reported in Table 2.

TABLE 2

| Properties | Examples 6 | Examples 7 | Comparative Examples 3 | Comparative Examples 4 |
|---|---|---|---|---|
| Dispersion of Resin | Good | Good | None used | None used. Fluid bled on to wheel |
| Amount of Charge (uc/g) | | | | |
| Initial | 26 | 27 | 25 | 24 |
| After 24 Hrs. @ 60° C. | 25 | 22 | 16 | 20 |
| Peel Strength (g/cm) | 25 | 29 | 42 | 15 |

That which is claimed is:

1. The present invention provides a toner composition for an electrostatic developer, said composition comprising an organic resin, a pigment, and an organosiloxane resin having a combination of difunctional and trifunctional repeating units, where said combination is selected from the group consisting of $(R^1SiO_{3/2})_m(R^1{}_2SiO)_n$, $(R^2SiO_{3/2})_m(R^2{}_2SiO)_n$, $(R^3SiO_{3/2})_m(R^3{}_2SiO)_n$, and $(R^4SiO_{3/2})_a(R^4{}_2SiO)_b(R^4SiO)_c$

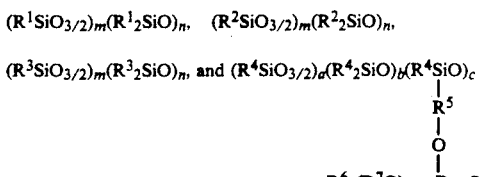

where each $R^1$, $R^4$, $R^6$ and $R^7$ are individually selected from monovalent substituted and unsubstituted hydrocarbon radicals, each $R^2$ is individually selected from the group consisting of monovalent hydrocarbon radicals and aminoalkyl radicals, where at least a portion of the $R^2$ substituents are aminoalkyl radicals, each $R^3$ is individually selected from the group consisting of monovalent hydrocarbon radicals and haloalkyl radicals, with the proviso that at least a portion of the $R^3$ substituents are haloalkyl radicals, a and c are positive numbers, b is 0 or a positive number, and m and n are both positive numbers, with the proviso that the sum and a, b and c and the sum of m and m each represent molecular weights equivalent to a softening point for said organosiloxane resin greater than 25° C. and not greater than 200° C. where $R^1$ represents a monovalent hydrocarbon radical, each $R^2$ is individually selected from the group consisting of monovalent hydrocarbon radicals and aminoalkyl radicals, where at least a portion of the $R^2$ substituents are aminoalkyl radicals, each $R^3$ is individually selected from the group consisting of monovalent hydrocarbon radicals and haloalkyl radicals, with the proviso that at least a portion of the $R^3$ substituents are haloalkyl radicals, m and n are both positive numbers and provide a softening point for said organosiloxane resin greater than 25° C. and not greater than 200° C.

2. A composition according to claim 1 where $R^1SiO_{3/2}$, $R^2SiO_{3/2}$, $R^3SiO_{3/2}$ and $R^4SiO_{3/2}$ are methylsiloxy or phenylsiloxy; $R^1{}_2SiO$ and $R^4{}_2SiO$ are combinations of diphenylsiloxane and dimethylsiloxane units, $R^2{}_2SiO$ is a combination of diphenylsiloxane, dimethylsiloxane, and $R^4(H)NCH_2CH_2N(H)(CH_2)_3Si(CH_3)O-$ units, where $R^4$ is hydrogen, octyl or benzyl, and $R^3{}_2SiO$ is a combination of diphenylsiloxane, dimethylsiloxane and 3-chloropropylmethylsiloxane, and said organic resin is a homopolymer or copolymer derived from styrene.

3. A composition according to claim 2 where the softening point of said organosiloxane resin does not exceed 150° C., the softening point of said organic resin does not exceed 200° C. and said organic resin constitutes from 80 to 90 percent of the total weight of said composition.

4. A composition according to claim 1 where

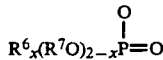

is the residue remaining following removal of the hydroxyl group of an acid selected from the group consisting of phosphoric acid esters, phosphonic acid esters and phosphinic acid esters.

5. A composition according to claim 1 where said combination is $(R^1SiO_{3/2})_m(R^1{}_2SiO)_n$ and said composition further comprises a charge regulator.

* * * * *